United States Patent
Danylchuk et al.

[15] 3,651,496

[45] Mar. 21, 1972

[54] MAGNETIC DOMAIN MULTIPLE INPUT AND CIRCUIT

[72] Inventors: Irynej Danylchuk, Morris Plains; Paul Charles Michaelis, Watchung, both of N.J.

[73] Assignee: Bell Telephone Laboratories, Incorporated, Murray Hill, N.Y.

[22] Filed: Oct. 1, 1970

[21] Appl. No.: 77,072

[52] U.S. Cl. ....................................340/174 TF, 340/174 SR
[51] Int. Cl. ....................................G11c 11/14, G11c 19/00
[58] Field of Search ............................................340/174 TF

[56] References Cited

UNITED STATES PATENTS 3,506,975 4/1970 Bobeck et al. ...................340/174 TF
3,508,225 4/1970 Smith ...............................340/174 TF
3,523,286 8/1970 Bobeck et al. ...................340/174 TF
3,530,444 9/1970 Bobeck et al. ...................340/174 TF
3,530,446 9/1970 Perneski ..........................340/174 TF
3,540,021 11/1970 Bobeck et al. ...................340/174 TF

*Primary Examiner*—Stanley M. Urynowicz, Jr.
*Attorney*—R. J. Guenther and Kenneth B. Hamlin

[57] ABSTRACT

A single wall domain, multiple-input, logical AND circuit is defined by an arrangement of magnetically soft overlay elements adjacent a sheet of material in which the domains can be moved. A plurality of propagation channels defined by the overlay elements include an orthogonal channel which comprises positions where domains are merely recirculated. When interrogated, the orthogonal channel provides an output only when all the idler positions are occupied.

8 Claims, 3 Drawing Figures

INVENTORS
I. DANYLCHUK
P. C. MICHAELIS
BY Herbert M. Shapiro
ATTORNEY

MAGNETIC DOMAIN MULTIPLE INPUT AND CIRCUIT

FIELD OF THE INVENTION

This invention relates to data processing arrangements, particularly arrangements which employ single wall domain propagation devices.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields for moving domains are often provided by an array of conductors pulsed individually by external drivers. The shape of the conductors is dictated by the shape of the domain and by the material parameters. Most materials suitable for the movement of single wall domains exhibit a preferred direction of magnetization normal to the plane of movement and are magnetically isotropic in the plane. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single wall domains in such a manner is disclosed in U.S. Pat. No. 3,460,116 of A. H. Bobeck, U.F. Gianola, R.C. Sherwood, and W. Shockley, issued Aug. 5, 1969.

An alternative propagation arrangement employs a magnetically soft overlay pattern on the surface of a suitable magnetic material. Attracting magnetic poles move in the overlay in response to a reorienting (viz., rotating) magnetic field. Domains follow the moving poles to move along a channel defined by the overlay geometry and the consecutive orientations of the magnetic field. Arrangements of this type are described in copending application Ser. No. 732,705, filed May 28, 1968 now U.S. Pat. No. 3,534,347 for A.H. Bobeck. A prime virtue of such an arrangement is that no electrical connections are required, a sequential mode of operation resulting which is particularly well suited for disc files.

On the other hand, it is helpful to be able to provide a capability of selective manipulation of domains compatible with such sequential operation. Naturally, inasmuch as such manipulation is desired, modification of the overlay geometry or additional localized field modifying means is required. Copending application Ser. No. 042,333, filed June 1, 1970 for W.F. Chow, for example, shows one such arrangement where a logical OR function is realized by a modified overlay geometry. In that arrangement a common magnetically soft elliptically shaped disc terminates a number of parallel channels formed by T- and bar-shaped overlay elements. A domain moving down any one or any number of the channels produces only one domain for movement about the periphery of the elliptic discs. In another such arrangement, a domain propagation channel is formed by T- and bar-shaped overlay elements disposed to define consecutive positions in which domains are recirculated without advancing along the channel. When all these recirculating positions, called "idlers," are occupied by domains, any additional domain generates a domain at the terminus of the channel in a single cycle of the rotating magnetic field. Such a circuit is called a " compressor" and is disclosed in copending application Ser. No. 038,124, filed May 18, 1970 for P. I. Bonyhard and I. Danylchuk.

BRIEF DESCRIPTION OF THE INVENTION

The present invention is a domain propagation arrangement employing an overlay arranged to provide a multiple AND logic function. In one embodiment, a plurality of parallel domain propagation circuits are defined by T- and bar-shaped overlay elements moving domain patterns therealong in response to a magnetic field rotating in the plane of a sheet of material in which single wall domains can be moved. Each of the channels terminates at an idler position of a compressor channel. Only when domains are advanced to the idler positions in all the channels is the compressor fully occupied. An interrogate domain is entered at an input end of the compressor channel producing a domain at its output only under full occupancy conditions thus realizing a multiple AND operation.

An interrogate operation is followed by an elimination of all domains in the compressor channel, conveniently realized by continued movement of domains along the propagation channels. In this instance, rather than the compressor being defined by terminal stages of the channels, the compressor may be thought of as defined along a Y coordinate of X oriented channels where the like stages of the channels along that Y coordinate constitute the idler positions of the compressor.

DETAILED DESCRIPTION

Figure 1:
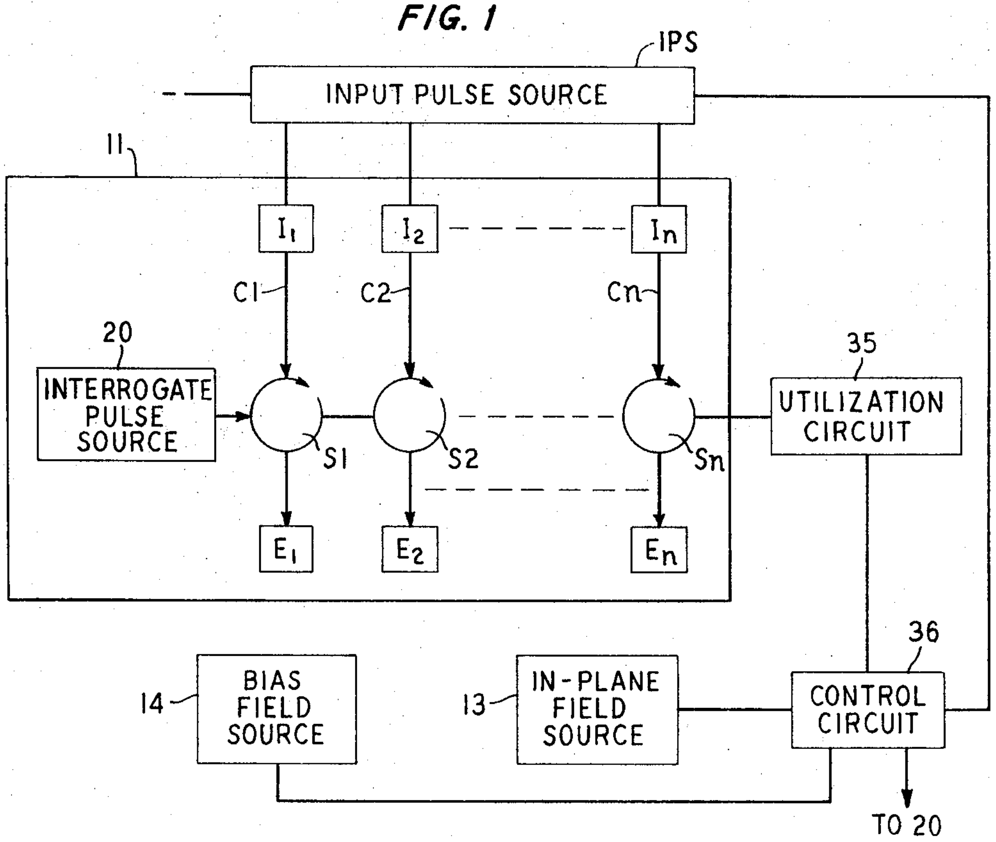
FIG. 1 is a schematic illustration of a logic arrangement in accordance with this invention.

FIG. 1 shows a multiple input AND arrangement in accordance with this invention. The arrangement comprises a sheet 11 in which single wall domains can be moved. An overlay of magnetically soft elements, symbolized in FIG. 1 and illustrated in detail in FIG. 2, define functional arrangements for domain manipulation organized for realizing a multiple input AND function.

Figure 2:
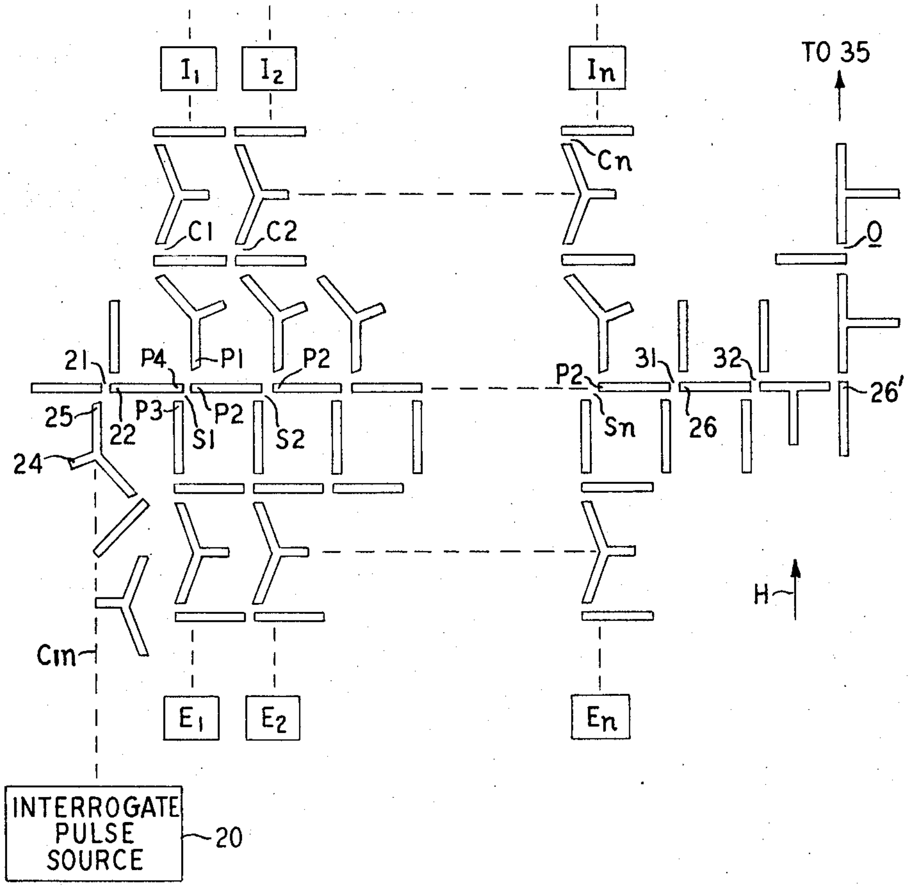

To be specific, the overlay elements, of T-, bar-, and Y-shaped geometries which are arranged along vertical axes, as viewed in FIGS. 1 and 2, define familiar domain propagation channels C1, C2 ...Cn. Domains introduced at an input at the top of these channels, as viewed, move downward in response to a rotating in-plane field in a manner consistent with that disclosed in the above-mentioned copending application of A. H. Bobeck and now well understood in the art.

A source of such an in-plane field is represented by block 13, so designated, in FIG. 1. The geometry of a domain, so generated and move, is maintained at a nominal value by a bias field supplied by a bias field source represented by block 14 in FIG. 1.

Each of the channels is shown in FIG. 1 originating at a block designated I accompanied by a numeral to indicate the associated channel. Each such block may be a domain generator of the type disclosed in copending application Ser. No. 756,210, filed Aug. 29, 1968 for A. J. Perneski now U.S. Pat. No. 3,555,527. Such a generator includes a magnetically soft disc, on the surface of sheet 11, about the periphery of which a source domain moves continuously as the in-plane field rotates. This source domain separates into two when signaled during the proper orientation of the in-plane field. One of the two resulting domains continues to circulate about the periphery of the disc while the other moves downward along the associated propagation channel.

Signals for controlling such domain generation are provided by familiar coding means represented in FIG. 1 by block IPS entitled "input pulse source."

Each propagation channel also includes an idler position, S1, S2 ...Sn, shown in FIGS. 1 and 2, about each of which a domain recirculates through the positions P1, P2, P3, and P4 (see FIG. 2). A domain moving downward along a channel Ci enters an idler Si at position P1 moving thereafter through the positions P2, P3, P4, and P1, consecutively as the in-plane field rotates clockwise as viewed in FIG. 2.

An interrogate channel Cin is defined by additional Y- and bar-shaped overlay elements to the left as also viewed in FIGS.

1 and 2. It is to be noted that the overlay elements defining Cin are disposed in a manner different from that of the remaining propagation channels. This difference is due primarily to choice and results in a domain moving upward, as viewed, along channel Cin while domains move downward in the remaining channels as the in-plane field rotates clockwise.

Domains for movement along channel Cin are generated in response to a pulse from an interrogate pulse source represented by block 20 in FIGS. 1 and 2. Such a source may be taken to include a domain generator of the type described for the propagation channels at I above.

An output channel 0 is defined by the T and bar overlay elements to the right as viewed in FIG. 2, forming a domain propagation channel for transmitting a domain to a suitable detection arrangement.

An interrogate operation is initiated when the domains moving down the channels Ci occupy the positions P2 in the idlers. At this juncture in the operation, an interrogate domain synchronously generated at 20 in FIG. 1 moves along interrogate channel Cin into an interrogate idler 21, of FIG. 2, towards position 22 which corresponds to positions P2 of the idlers Si. It is assumed that a domain occupies idler 21 when an interrogate domain is generated, a condition easily realized in practice. It will be seen that the interrogate domain replaces the one assumed present there thus resulting in idler 21 being occupied permanently in normal operation.

An interrogate domain at position 24, in FIG. 2, in its movement toward idler 21 denies position 25 to a domain at 22 when the field next rotates to the orientation shown by arrow H in the figure. Consequently, the latter domain moves to an alternative position P3 of channel C1, causing all the domains in the compressor to be displaced one channel to the right. A domain appears at the right of the compressor, as viewed, in position 26 if and only if all the idlers are occupied. If any idler is unoccupied, no domain appears at 26. Consequently, a domain at 26 indicates that a domain was generated at each of the inputs of all of the channels previously via the inputs Ii... In, thus indicating the realization of a multiple input AND operation.

We will assume, arbitrarily, two additional idler positions at the output end of the compressor for illustrative purposes. These are designated 31 and 32 in FIG. 2 and, as was the case with idler 21, are assumed to be occupied permanently thus enabling the interrogated domain to produce a domain at 26′ for movement upward, as viewed in FIG. 2, along output channel 0 to a utilization circuit represented by block 35 in FIG. 1. Again, the presence of the additional idlers is a matter of design and merely reflects the layout of the overlay pattern.

A suitable detection arrangement may include a Hall effect detector of the type described in copending application Ser. No. 882,900, filed Dec. 8, 1969 for W. Strauss now Pat. No. 3,609,720.

Sources 13, 14, 20, and IPS and utilization circuit 35 are under the control of a control circuit 36. The various sources and circuits are any such elements capable of operating in accordance with this invention.

Figure 3:
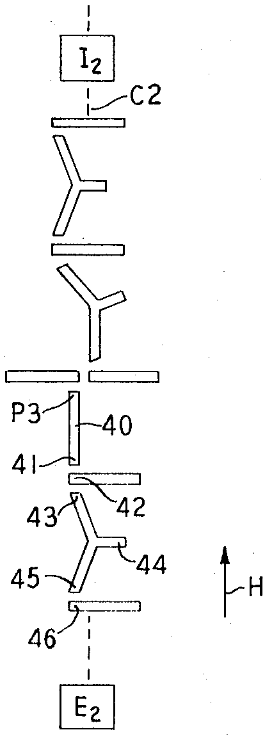
FIGS. 2 and 3 are schematic illustrations of portions of the arrangement of FIG. 1 showing magnetic conditions thereof during operation.

After the interrogate operation, a reset operation removes domains from each of those idlers (S1–Sn) of the compressor which are part of a vertical channel. This operation is initiated by the reversal of the direction of rotation of the in-plane field for one-half cycle. FIG. 3 shows a portion of a representative channel C2 where a domain is in position P3 when the in-plane field is in a direction represented by the arrow H there and is now reorienting counterclockwise instead of clockwise. Overlay element 40 as shown in FIG. 3 is arranged to facilitate movement of the domain to position 41 when the field rotates counterclockwise 180 degrees from that shown in FIG. 2. The domain thereafter moves along the positions 42, 43, 44, 45 and 46 as the in-plane field thereafter rotates clockwise.

Each propagation channel terminates at a block Ei as indicated in FIGS. 1 and 2. The blocks represent domain annihilators. Each of these blocks may be taken to represent a magnetically soft disc about the periphery of which a domain is moved as was the case with the domain generators Ii above. The arrangement annihilates domains in a manner well known as disclosed in copending application Ser. No. 795,148, filed Jan. 30, 1969 for R. H. Morrow and A. J. Perneski now U.S. Pat. No. 3,577,131.

The illustrative logical AND arrangement in accordance with this invention is shown occupying the entire sheet 11 in FIG. 1. It is contemplated, however, that only a small fraction of the area of a sheet will be used for this function in practice. Consequently, it is possible that generators Ii could be for example the outputs of domain propagation channels defined in other portions of sheet 11 and source IPS of FIG. 1 may be taken to represent such channels.

What has been described is considered merely illustrative of the principles of this invention. Accordingly, various alternatives may be devised by those skilled in the art in accordance with those principles within the spirit and scope of this invention.

What is claimed is:

1. A domain propagation arrangement comprising a sheet of material in which single wall domains can be moved, a magnetically soft overlay of a repetitive geometry for defining *n* multistage domain propagation channels each having a first and a second stage, said overlay having a geometry such that said second stages define an *n*+1th channel including input and output stages, each of said second stages being of a geometry such that a domain circulates there in response to a reorienting in-plane magnetic field, means for providing domains at said input stage and means for detecting the presence of a domain at said output stage.

2. An arrangement in accordance with claim 1 wherein said *n*+1th channel includes at least *n*+2 stages.

3. An arrangement in accordance with claim 2 including means for selectively providing domains in said first stages of said *n* channels.

4. An arrangement in accordance with claim 3 also including means for annihilating domains from said *n* stages of said *n*+th channel.

5. An arrangement in accordance with claim 4 also including means for generating a rotating in-plane magnetic field.

6. An arrangement in accordance with claim 5 wherein said means for annihilating domains comprises additional stages in each of said *n* channels and means for moving domains controllably from said second stages along said additional stages.

7. An arrangement in accordance with claim 6 wherein said additional stages are defined by an overlay geometry such that a reversal in the direction of rotation in said in-plane field moves domains from said second stages to said additional stages, and said arrangement also includes means for selectively reversing the direction of rotation of said in-plane field.

8. An *n*-input logical AND circuit comprising a sheet of material in which single wall domains can be moved, a magnetically soft overlay of a repetitive geometry for defining *n* multistage domain shift registers each having input and output stages and an intermediate stage, said overlay having a geometry such that said intermediate stages define an *n*+1th shift register having *n* stages and including an input stage, each of said intermediate stages having a geometry to circulate a domain there in response to a reorienting in-plane field, means for selectively providing domains at said input stages, means for generating a reorienting field for moving domains to said intermediate positions, means for providing a domain at said input stage of said *n*+1th shift register, and means responsive to the provision of said domain at said input stage of said *n*+1th shift register for detecting the presence of domains in all of said *n* stages of said *n*+1th shift register.

* * * * *